United States Patent
Wright et al.

(10) Patent No.: US 7,500,145 B2
(45) Date of Patent: Mar. 3, 2009

(54) ANOMALY-DRIVEN SOFTWARE SWITCH TO CAPTURE EVENT RESPONSES AND AUTOMATE RECOVERY

(75) Inventors: Bryan J. Wright, Tucson, AZ (US); David L. Wright, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 10/857,592

(22) Filed: May 28, 2004

(65) Prior Publication Data

US 2005/0278789 A1  Dec. 15, 2005

(51) Int. Cl.
*G06F 11/00* (2006.01)

(52) U.S. Cl. .............................. 714/26; 714/25; 714/45; 714/46

(58) Field of Classification Search .................. 714/25, 714/26, 33, 38, 39, 45, 46
See application file for complete search history.

(56) References Cited

U.S. PATENT DOCUMENTS

| | | | |
|---|---|---|---|
| 5,107,499 A * | 4/1992 | Lirov et al. ..................... 714/26 |
| 5,127,005 A * | 6/1992 | Oda et al. ...................... 714/26 |
| 5,214,653 A * | 5/1993 | Elliott et al. ................... 714/26 |
| 5,450,570 A | 9/1995 | Richek et al. |
| 5,528,750 A | 6/1996 | Lubart et al. |
| 5,539,877 A * | 7/1996 | Winokur et al. ................ 714/26 |
| 5,805,160 A * | 9/1998 | Yoshida et al. ................ 714/25 |
| 5,805,785 A | 9/1998 | Dias et al. |
| 5,881,222 A | 3/1999 | Berry et al. |
| 5,944,839 A * | 8/1999 | Isenberg ....................... 714/26 |
| 5,983,364 A * | 11/1999 | Bortcosh et al. .............. 714/25 |
| 6,088,712 A | 7/2000 | Huang et al. |
| 6,184,880 B1 | 2/2001 | Okada |
| 6,442,542 B1 * | 8/2002 | Ramani et al. ................ 714/26 |
| 6,477,531 B1 * | 11/2002 | Sullivan et al. ............... 714/25 |
| 6,574,537 B2 * | 6/2003 | Kipersztok et al. ........... 714/25 |
| 6,883,118 B2 * | 4/2005 | Morgan et al. ................ 714/25 |
| 7,007,200 B2 * | 2/2006 | Salem .......................... 714/26 |
| 2005/0015678 A1 * | 1/2005 | Miller .......................... 714/38 |

FOREIGN PATENT DOCUMENTS

| JP | 01-237833 | 9/1989 |
|---|---|---|
| JP | 05-35382 | 2/1993 |

* cited by examiner

*Primary Examiner*—Robert Beausoliel
*Assistant Examiner*—Joseph D Manoskey
(74) *Attorney, Agent, or Firm*—William K. Konrad; Konrad Raynes & Victor LLP

(57) ABSTRACT

Anomaly-driven software for capturing and automating responses to computer anomalies is disclosed. Computer anomalies are processed by identifying the occurrence of an anomaly and correcting the computer anomaly by initiating a stored corrective action based on a user's input for resolving the anomaly.

21 Claims, 5 Drawing Sheets

ANOMALY-DRIVEN SOFTWARE SWITCH TO CAPTURE EVENT RESPONSES AND AUTOMATE RECOVERY

BACKGROUND OF THE INVENTION

1. Field of the Invention

The present invention relates in general to computer software, and more particularly to anomaly-driven software for capturing and automating responses to computer anomalies.

2. Description of the Related Art

Computer systems typically include a processor coupled to a hierarchical storage system. The system's hardware can dynamically allocate parts of memory within the storage hierarchy for addresses deemed most likely to be accessed soon. The type of storage employed in each stage of the hierarchy relative to the processor is normally determined by balancing requirements for speed, capacity, and costs.

Computer processes continually refer to this storage over their executing life times, both reading from and writing to the staged storage system. These references include self-referencing as well as references to every type of other process, overlay or data. It is well-known in the art that data storage devices using high-speed random access memories (RAM) can be referenced orders of magnitude faster than high volume direct-access storage devices (DASD's) using rotating magnetic media. Such electronic RAM storage relies upon high-speed transfer of electrical charges over small distances, while DASD's typically operate mechanically by rotating a data storage position on a magnetic disk with respect to read-write heads. The relative cost of a bit of storage for DASD and RAM makes it necessary to use DASD for bulk storage and electronic RAM for processor internal memory and caching.

A wide variety of computer processing errors regularly occur in computer systems. Some may be relatively inert and the computer system may continue to operate in its normal capacity. Other computer errors can result in a system failure and may require restarting the computer system. In order to correct processing errors that fall between the two extremes, corrective actions need to be taken.

Correcting computer processing errors can be complicated and may be difficult to remember if the same error occurs in the future. Some computer applications include a recording function, which allow for recording of actions taken to correct the computer error. However, such applications require a user to manually initiate recording and replaying the actions taken.

In addition to computer processing errors, computer systems can present computer operators with other unwanted events or anomalies. One such event can take the form of a pop-up message, for example. Computer applications similar to the application described above can be used to record steps taken to remove the message. However, and similar to above, the computer operator may be required to manually initiate recording and replaying actions taken to remove the message.

Efficiently and effectively correcting computer processing errors and handling other general but unwanted events are becoming more important as computers are increasingly depended upon. When a computer operator is required to manually initiate recording processes for correcting computer processing errors or other unwanted events, inefficiencies can result. Furthermore, the steps taken by a computer operator may or may not be an effective method to overcome the computer anomaly.

It can be seen that there is a need for a method and apparatus for initiating and evaluating recorded computer processes for efficient and effective correction of future occurrences of the same or similar computer anomaly.

SUMMARY OF THE INVENTION

To overcome the limitations in the prior art described above, and to overcome other limitations that will become apparent upon reading and understanding the present specification, the present invention discloses a method, apparatus and program storage device for capturing and automating responses to computer anomalies.

Embodiments of the present invention solve the above-mentioned problems by processing computer anomalies by identifying the occurrence of an anomaly and correcting the computer anomaly by initiating a stored corrective action based on a user's input for resolving the anomaly.

A program storage device in accordance with an embodiment of the present invention includes program instructions executable by a processing device to perform operations for processing computer anomaly resolutions including detecting at least one computer anomaly and recording user action taken to resolve the anomaly.

In another embodiment of the present invention, another program storage device is provided. These program instructions are executable by a processing device to perform operations for processing computer anomaly resolutions including detecting at least one computer anomaly and initiating a recorded action for resolving the at least one computer anomaly.

In another embodiment of the present invention, a system for processing computer anomaly resolutions is provided. The system includes a computer processor configured to detect at least one computer anomaly and a memory coupled to the processor configured to record user action taken to resolve the anomaly.

In another embodiment of the present invention, another system for processing computer anomaly resolutions is provided. This system includes a processor configured to detect at least one computer anomaly and a memory, coupled to the processor, configured to store a set of recorded actions for resolving the at least one computer anomaly, wherein the processor is configured to initiate the set of recorded action stored in the memory upon detecting a computer anomaly.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

A method, apparatus and program storage device for capturing and automating responses to computer anomalies is provided. Computer anomalies are processed by identifying the occurrence of an anomaly and correcting the computer anomaly by initiating a stored corrective action based on a user's input for resolving the anomaly.

Figure 1A:
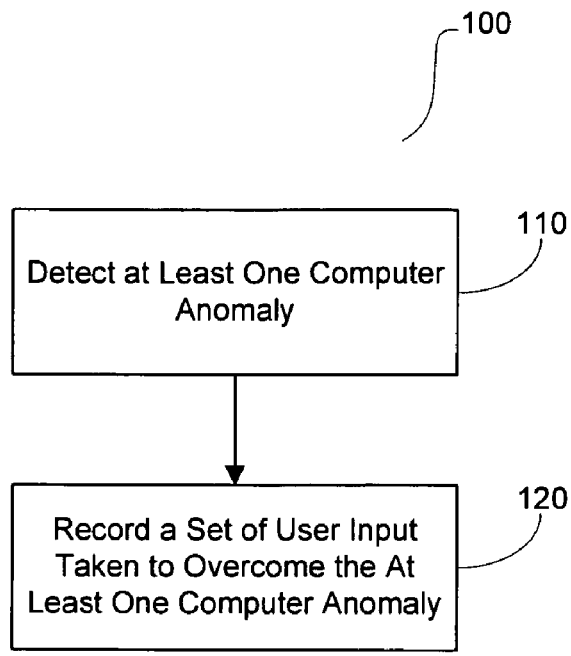
FIGS. 1a and 1b are flowcharts of methods of recording and resolving computer anomalies in accordance with the present invention.

FIG. 1a illustrates a method 102 for processing computer anomaly resolutions includes detecting 110 at least one computer anomaly and recording 120 the user input taken to resolve the anomaly. An anomaly may include the presence of any unusual and potentially hazardous state within the activities of a computer user, system, or network. "Unusual" is defined with respect to some model of "normal" behavior that may be either hard-coded or learned from observation. An anomaly may also include operational variance from normal operation of a computer, system, or network. Some examples of an operational variance include, but are not limited to, computer processing errors, a failed correction sequence, human error, a state that inhibits user work such as a computer freezing or hanging and a user defined state. Furthermore, users or developers can define anomalies. For example, a user may choose to define an Internet pop-up window as an anomaly, with the recorded response being the automatic closure of any pop-up. Or a user may not like a virus scanning software program starting at random on its own and so establishes its start as an anomaly, with the necessary steps for shutting it down being the recorded response.

Saved responses can be stored in detail or can be stored as general parameters. A detailed recorded response can resolve future occurrences of the same or relatively similar computer anomalies. Saving user input in general terms can allow for the resolution of a wider variety of computer anomalies. Mapping saved actions to other similar anomalies by inserting/applying user-generated action-specific parameters to a generalized set of responses can effectively remedy computer anomalies.

Figure 1B:
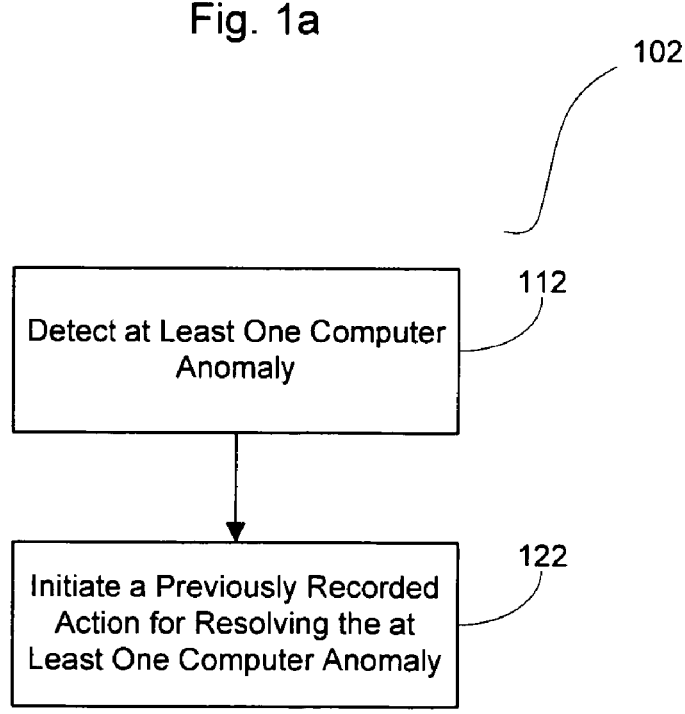

FIG. 1b illustrates a method 102 for processing computer anomalies in accordance with further embodiments of the invention. At least one computer anomaly is detected 112 and a previously recorded action for resolving computer anomaly is initiated 122. Such an action can include user actions described above in FIG. 1a.

Figure 2:
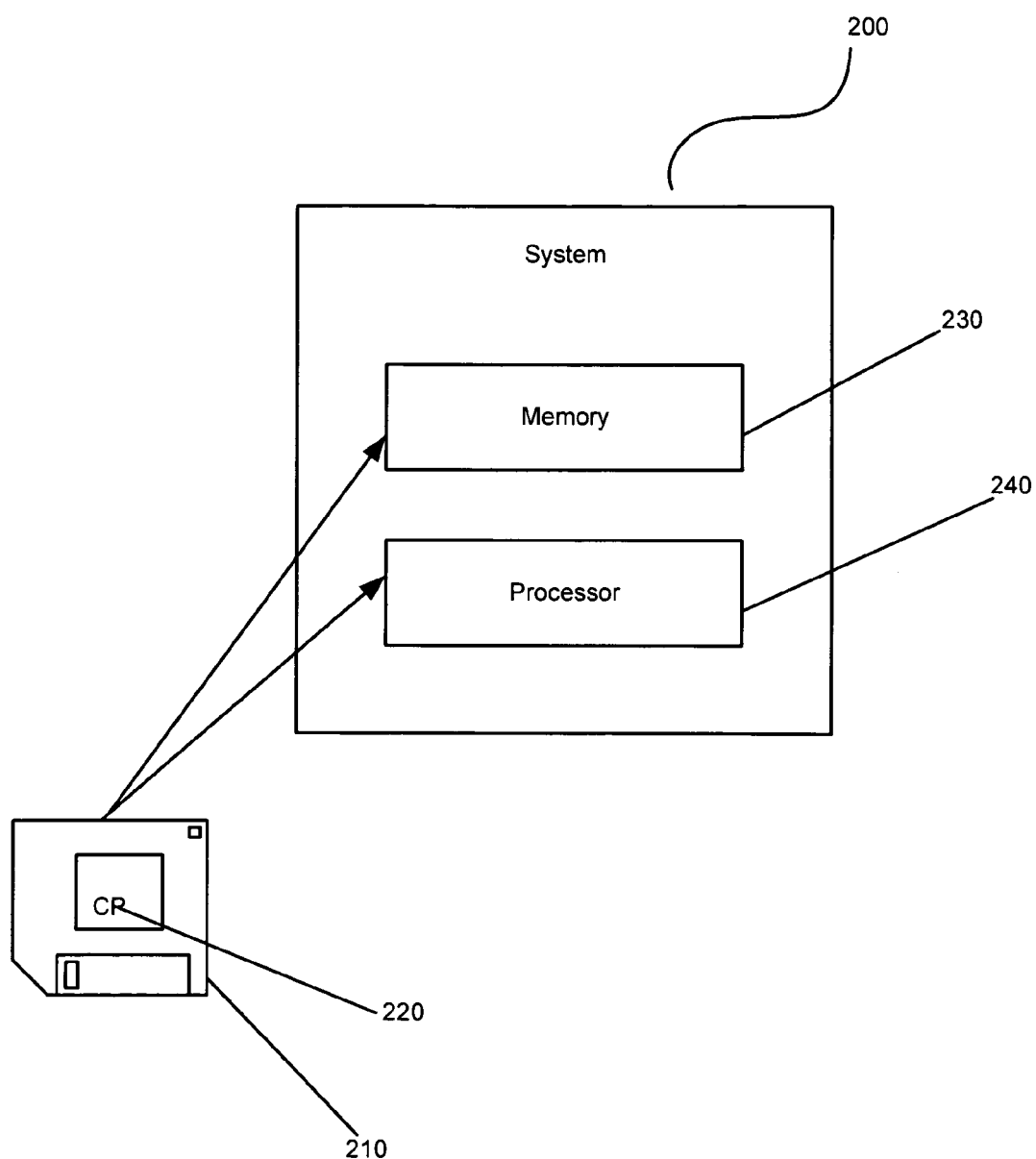
FIG. 2 is a block diagram of a system that incorporates methods for resolving computer anomalies in accordance with embodiments of the invention.

FIG. 2 illustrates a system 200 according to the present invention, wherein the processes illustrated in FIGS. 1a, 1b and 3-5 may be tangibly embodied in a computer-readable medium or carrier, e.g. one or more of the fixed and/or removable data storage devices 210 or other data storage or data communications devices. A computer program 220 expressing the processes embodied on the removable data storage devices 210 may be loaded into the memory 230 or into the system 200, e.g., in a processor 240, to configure the system 200 of FIG. 2 for execution. The computer program 220 comprise instructions which, when read and executed by the system 200 of FIG. 2, causes the system 200 to perform the steps necessary to execute the steps or elements of the present invention.

Figure 3:
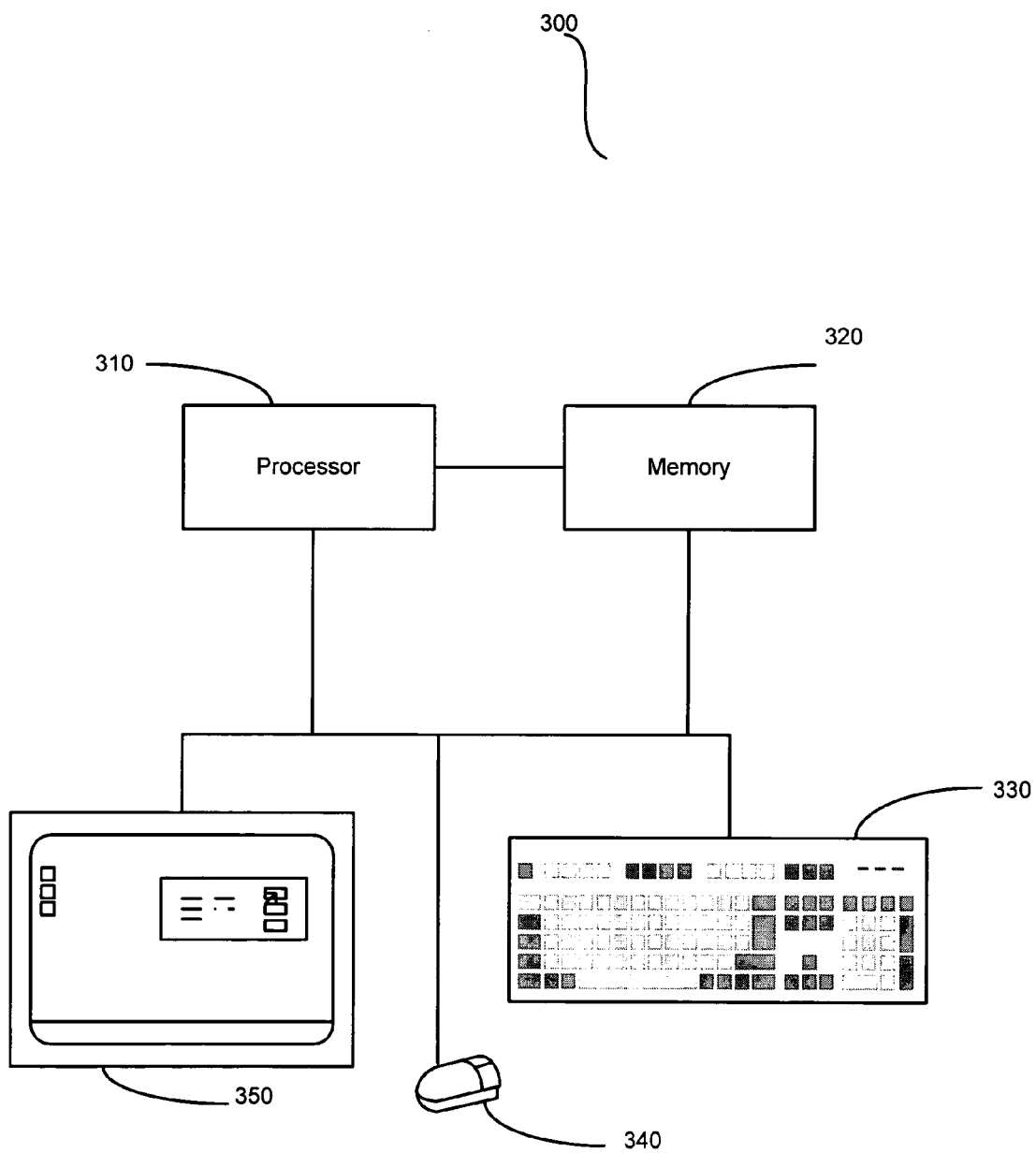
FIG. 3 is another block diagram of a system that incorporates methods for resolving computer anomalies in accordance with embodiments of the invention.

FIG. 3 is a more detailed embodiment of a system 300 that implements anomaly-driven software in accordance with embodiments of the present invention. Processor 310 in system 300 operates by receiving instructions and data from various sources including memory 320 and from users through user interactions with keyboard 330 and mouse 340. Memory 320 can be embodied in a variety of forms including disk drivers, tape, CD-ROM and removable storage. Processor 310 detects computer anomalies found in system 300. Then, in an automatic anomaly response recording mode, processor 310 informs the user that recording the response is initiated and instructs memory 320 to capture computer user responses taken to resolve the computer anomalies. Once computer user response has resolved the computer anomaly the user can indicate recording is complete by, for example, entering a keystroke on keyboard 330. In a manual recording mode processor 310 can indicate to the user that computer anomalies have been detected and then give the user the option to record the response. After the user responds affirmatively by, for example, clicking on an "OK" button found on screen 350 using mouse 340, processor 310 instructs memory 320 to capture responses performed by the user to resolve the anomalies. Captured responses to computer anomalies can be stored and replayed in future occurrences of the same or similar computer anomalies. When the same or similar computer anomalies are detected by processor 320, the recorded responses to the anomalies are retrieved from memory 320 and replayed. In a replay situation processor 310 can automatically run the recorded response to the detected computer anomalies and indicate to the user that the computer anomalies have been resolved by, for example, sending a message to screen 350 to indicate to the user that the anomaly has been resolved. Alternatively, after processor 310 detects one or more computer anomalies the processor can send the user a message indicating the anomalies have been detected and give the user the option to manually run the recorded response. In further embodiments of the present invention, processor 310 can provide a computer user with instructions on how to more efficiently overcome future occurrences of similar anomalies, or can provide information related to the recorded set of actions to a user assistance directory.

Figure 4A:
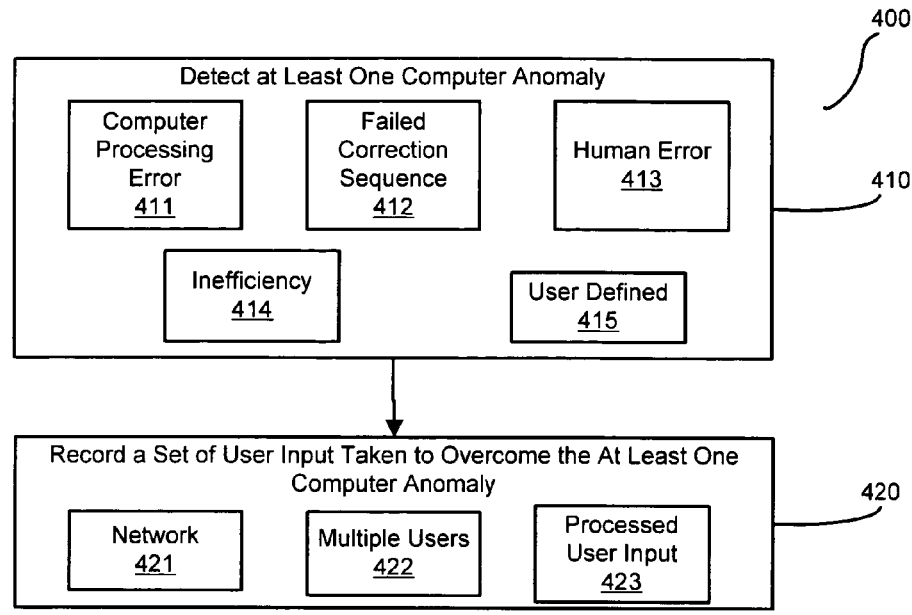
FIGS. 4a and 4b are flowcharts of methods of recording and resolving computer anomalies in accordance with the present invention.

FIG. 4a illustrates method 400 for processing computer anomalies illustrated in FIG. 1a. Computer anomalies, in a variety of forms, are detected 410 in accordance with the present invention. For example, computer processing errors 411, failed correction sequences 412 and human error 413 can be considered computer anomalies and be detected in embodiments of the invention. Inefficiencies 414 not necessarily connected to computer errors or failures can also be identified as an anomaly. In addition, a computer anomaly can be user defined 415. This allows the user to provide identification of certain annoying or inefficient events. Upon detecting 410 one or more computer anomalies user action taken to overcome the one or more anomalies is recorded 420. Recording user input to overcome computer anomalies can include recording a series of operations performed in a network 421. Multiple users 422 too can provide input in order to overcome computer anomalies. Alternatively, user input from a variety of sources can be processed 423 and captured as user action for the resolution of computer anomalies.

Figure 4B:
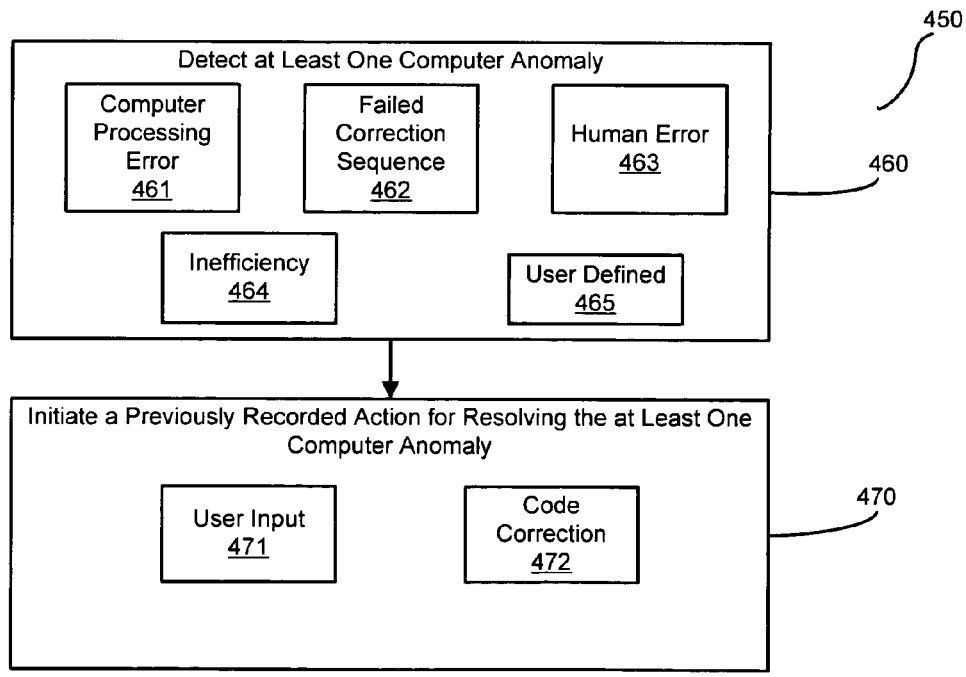

FIG. 4b shows a method 450 for processing computer anomaly resolutions according to another embodiment of the present invention. At least one computer anomaly, which can take a variety of forms, is detected 460. Computer processing errors 461, failed correction sequences 462, human error 463, computer inefficiencies 464 and user defined anomalies 465 can all be considered computer anomalies in accordance with the invention. After detecting one or more computer anomalies, a previously recorded action for resolving the detected 460 computer anomaly is initiated 470. Previously recorded actions used to overcome one or more computer anomalies can include a set of actions taken by a user 471. User input 471 includes network input, multiple user input and processed user input and can be altered by a user or by a computer program, for example. Alternatively, a previously recorded code correction sequence 472 can be used to resolve the detected computer anomaly and/or can be used to permanently correct computer code.

The methods 400, 450 described in FIGS. 4a and 4b can be set to run automatically or manually. Methods operating automatically in accordance with the invention can for example, allow a user to define various events as anomalies so that the detected events trigger on the recording and/or initiating function. In an automatic recording function, a detected anomaly automatically triggers recordation of steps taken to resolve the user-defined anomaly. For automatic replay functions, initiating recorded actions automatically can allow for a user to continue working in a normal, uninterrupted manner while the computer program automatically resolves the detected anomaly.

Figure 5:
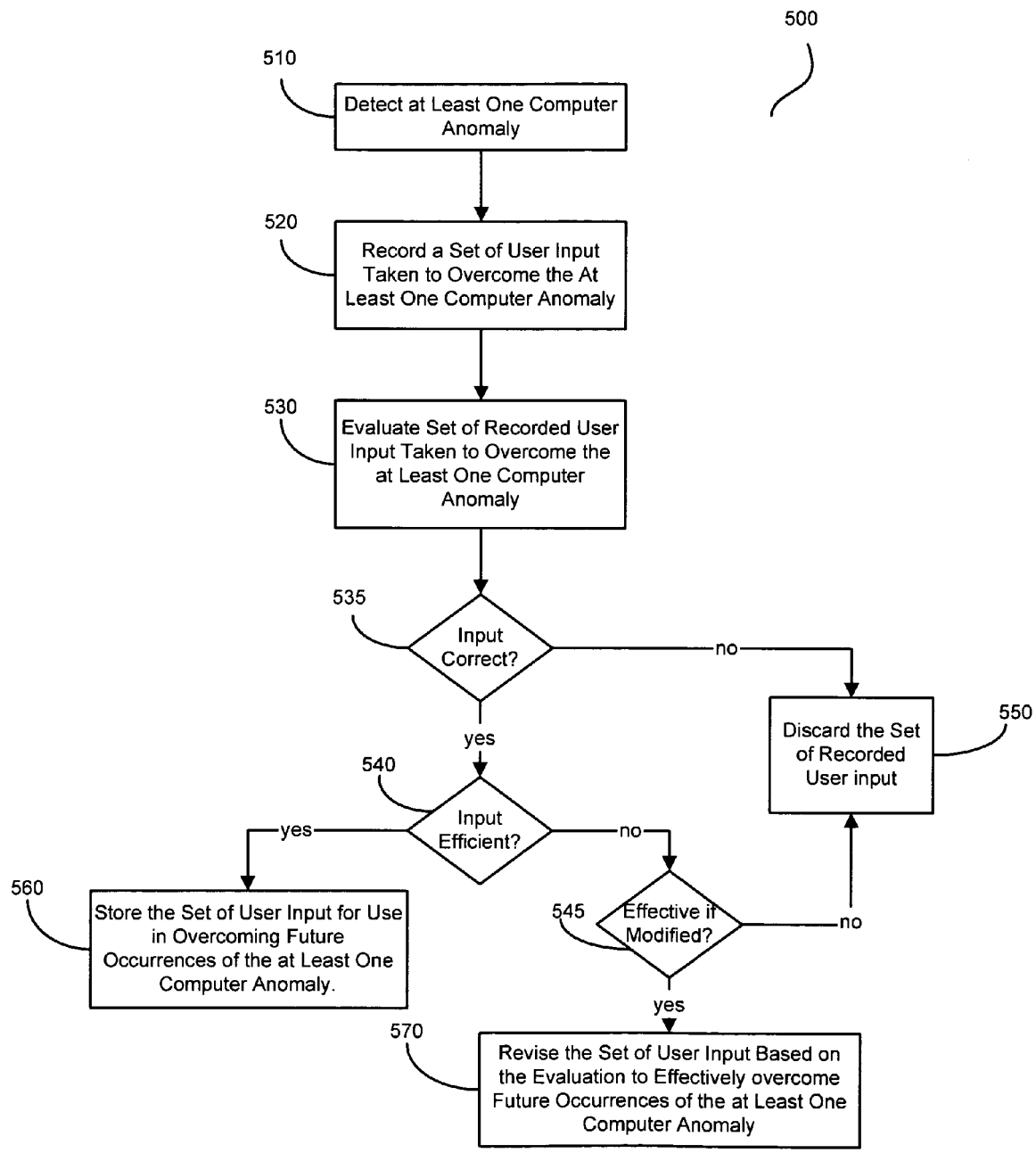
FIG. 5 is a flowchart of another method for responding to computer anomalies in accordance with the present invention.

FIG. 5 illustrates method 500 in accordance with embodiments of the invention. After a computer anomaly is detected 510 and user action is recorded 520, the recorded set of user input is evaluated 530. Evaluating the steps taken to resolve the anomaly can include evaluation by users, system administrators, support groups and computer programs. In the present embodiment, evaluating the set of user actions can include determining whether the user input was correct 535 for resolving the computer anomaly. When the input was not correct the set of recorded input can be discarded 550. When the input is correct, an additional evaluation step of determining whether the steps taken to resolve the anomaly were efficient 540 is determined. When efficient, the user action is stored 560 for use in resolving future occurrences of the same or similar computer anomaly. When correct but inefficient, the user action can be further evaluated to determine if altering the input would result in an efficient, standard corrective response for future occurrences of the anomaly. A determination is made whether altering the user input would result in an effective method to overcome future occurrences of the detected anomaly 545. If yes, the user action is revised 570 and stored in the revised form. When the user input would not be effective, even if modified, the set of recorded input may be discarded 550 or categorized as a set of actions that do not effectively resolve the detected computer anomaly.

In further embodiments, results generated from the evaluation can be sent to a user for informational or training purposes. This allows the user to learn how to most efficiently resolve similar computer anomalies in situations where the user chooses to manually resolve similar computer anomalies, for example.

While operating manually or automatically, embodiments of the invention can be programmed such that when an identical anomaly occurs the sequence is replayed to resolve the anomaly. In further embodiments of the invention, a more generalized sequence is saved and used in resolving future instances of similar anomalies.

In situations where another anomaly occurs while a corrective sequence is running the present invention can initiate another recording and/or initiating function. Thus, the present invention allows for a continually evolving sequence for review and repair. Further advantages of this invention lie in its immediacy, in its capture of a computer user's problem-solving activities, and in the potential option to replay actions for an identical situation encountered in the future.

In summary, an embodiment of the present invention provides a method for resolving computer processing anomalies by implementing user input and computer generated input. When anomalies occur in computer processes, a recording function that captures user command and computer responses that follow. The user takes several steps that involve accessing a particular configuration and deleting or destroying it. In this embodiment the actions succeed in correcting the error, and the option exists to replay the recorded sequence if the identical problem appears again.

The anomaly parameters that drive the switch can be set at granular or more general levels. If set to be so granular as to be implemented only for a situation with the identical parameters, any similar anomaly having the slightest deviation would result in a new recording. Users would interact with a process only when a new set of parameters initiated an anomaly. In some cases exact parameters may not be relevant, and a more general application of the recording can be applied. As long as the machine-generated response mirrors that in the captured sequence, no error or alarm is issued. The process runs to completion, freeing the user from the problem-solving tasks and eliminating calls to customer support. Thus, at least three problems related to computer processing may be solved. First, when a computer processing anomaly occurs and the user takes the proper corrective actions, the user must remember those actions and then repeat them whenever the error again occurs.

An embodiment of the present invention allows the capture of those actions, which can then be run again automatically, or used to program a permanent fix. This frees the user from identifying the same error in the future and taking the same set of corrective actions. Furthermore, developers are provided with a way to automate error correction in the code, and the invention improves a product because it "learns" how to correct errors without user input. Next, when computer processing anomalies occur, the user often takes various actions that can help or hinder a resolution.

An embodiment of the present invention allows for a capture or recording of those actions, which can then be evaluated. If the user's actions hindered a resolution, the record provides concrete details that help in training the user, in updating the related user assistance documentation, and in providing other important information related to the error. Lastly, in the general course of working with a computer, certain events occur that inhibit a user's work. This invention allows for the establishment of a standard response for certain standard, annoying events.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program storage device, comprising:
program instructions executable by a processing device to perform operations for processing operations for processing computer anomaly resolutions, comprising:

receiving a user computer anomaly recording mode selection input;

selecting one of an automatic computer anomaly recording mode and a manual computer anomaly recording mode in response to said user mode selection input;

detecting at least one computer anomaly;

in said automatic computer anomaly recording mode, automatically recording action taken by a user during resolution of the anomaly;

in said manual computer anomaly recording mode:
receiving a user computer anomaly recording initiation input; and
in response to said user recording initiation input, recording action taken by a user during resolution of the anomaly;

evaluating the set of recorded user input taken to overcome the at least one computer anomaly; and maintaining the recorded set of user input based on the evaluation for use in overcoming future occurrences of the at least one computer anomaly.

2. The program storage device of claim 1, wherein the action taken by a user comprises input from multiple users.

3. The program storage device of claim 1, wherein the action taken by a user comprises processed user input.

4. The program storage device of claim 1 further comprising storing a revised set of user input based on the evaluation for use in overcoming future occurrences of the at least one computer anomaly.

5. The program storage device of claim 1 further comprising discarding the set of recorded user input based on the evaluation.

6. The program storage device of claim 1, wherein evaluating the set of recorded user input comprises determining whether the at least the computer anomaly has been resolved by the recorded set of actions.

7. The program storage device of claim 1, wherein evaluating the set of recorded user input comprises determining whether the at least one computer anomaly has been resolved efficiently.

8. The program storage device of claim 1 further comprising sending a user the results of the evaluation.

9. The program storage device of claim 8, wherein the results of the evaluation comprises instructions on overcoming future occurrences of the at least one computer anomaly.

10. The program storage device of claim 1, wherein the operations further comprise:
detecting a second computer anomaly; and
in an automatic replay mode:
comparing said second computer anomaly to said at least one computer anomaly; and
automatically replaying said recorded user input to resolve said second computer anomaly if said second computer anomaly is sufficiently similar to said at least one computer anomaly.

11. The program storage device of claim 10, wherein the operations further comprise:
in a manual replay mode:
receiving a user replay initiation input; and
replaying said recorded user input to resolve said second computer anomaly.

12. The program storage device of claim 11, wherein the operations further comprise:
receiving a user replay mode selection input; and
selecting one of said automatic replay mode and said replay mode in response to said user mode selection input.

13. A system for processing computer anomaly resolutions, comprising:
a computer processor configured to receive a user computer anomaly recording mode selection input, to select one of an automatic computer anomaly recording mode and a manual computer anomaly recording mode in response to said user mode selection input; and to detect at least one computer anomaly;
a memory coupled to the processor wherein said processor is configured to:
in said automatic computer anomaly recording mode, automatically record in said memory action taken by a user during resolution of the anomaly; and
in said manual computer anomaly recording mode:
receive a user computer anomaly recording initiation input; and
in response to said user recording initiation input, record in said memory action taken by a user during resolution of the anomaly; wherein the processor is further configured to evaluate the set of recorded user input taken to overcome the at least one computer anomaly, to send a user the results of the evaluation, and to provide instructions for resolving future occurrences of the at least one computer anomaly; and
a display device configured to receive the sent results of the evaluation.

14. The system of claim 13, wherein the memory is configured to record input from a computer network.

15. The system of claim 13, wherein the memory is configured to record input from multiple users.

16. The system of claim 13, wherein the memory is configured to record input comprising processed user input.

17. The system of claim 13 further comprising a signal configured to indicate when the memory has completed recording the action taken by a user.

18. The system of claim 17, wherein the signal configured to indicate recording is complete comprises a keyboard stroke.

19. The system of claim 13, wherein the processor is further configured to:
detect a second computer anomaly; and
in an automatic replay mode:
compare said second computer anomaly to said at least one computer anomaly; and
automatically replay said recorded user input to resolve said second computer anomaly if said second computer anomaly is sufficiently similar to said at least one computer anomaly.

20. The system of claim 19, wherein the processor is further configured to:
in a manual replay mode:
receive a user replay initiation input; and
replay said recorded user input to resolve said second computer anomaly.

21. The system of claim 20, wherein the processor is further configured to:
receive a user replay mode selection input; and
select one of said automatic replay mode and said replay mode in response to said user mode selection input.

* * * * *